(12) United States Patent
Du Bourg De Luzencon

(10) Patent No.: US 10,154,387 B2
(45) Date of Patent: Dec. 11, 2018

(54) PROCESS OF INITIATION OF A CONVERSATION

(71) Applicant: OBERTHUR TECHNOLOGIES, Levallois-Perret (FR)

(72) Inventor: Baudouin Du Bourg De Luzencon, Nanterre (FR)

(73) Assignee: OBERTHUR TECHNOLOGIES, Levallois-Perret (FR)

( * ) Notice: Subject to any disclaimer, the term of this patent is extended or adjusted under 35 U.S.C. 154(b) by 0 days.

(21) Appl. No.: 13/714,790

(22) Filed: Dec. 14, 2012

(65) Prior Publication Data

US 2014/0057612 A1   Feb. 27, 2014

(30) Foreign Application Priority Data

Dec. 15, 2011  (FR) ..................... 11 61697

(51) Int. Cl.
| | |
|---|---|
| *H04M 3/42* | (2006.01) |
| *H04W 4/16* | (2009.01) |
| *H04M 1/57* | (2006.01) |
| *H04M 1/725* | (2006.01) |

(52) U.S. Cl.
CPC .............. *H04W 4/16* (2013.01); *H04M 1/57* (2013.01); *H04M 1/575* (2013.01); *H04M 1/72547* (2013.01); *H04M 3/42042* (2013.01)

(58) Field of Classification Search
CPC ..... H04M 3/42042; H04M 1/57; H04M 1/575
USPC .................... 455/415, 414.1, 418, 422.1, 466
See application file for complete search history.

(56) References Cited

U.S. PATENT DOCUMENTS

| | | | |
|---|---|---|---|
| 5,001,709 A | 3/1991 | Satoh | |
| 5,720,014 A * | 2/1998 | Ikeda et al. | 358/1.15 |
| 6,317,609 B1 * | 11/2001 | Alperovich et al. | 455/556.1 |
| 8,453,140 B2 * | 5/2013 | Thakkar et al. | 717/172 |
| 2002/0067807 A1 * | 6/2002 | Danner et al. | 379/88.12 |
| 2003/0100295 A1 * | 5/2003 | Sakai et al. | 455/415 |
| 2005/0094788 A1 | 5/2005 | Lipton et al. | |
| 2005/0197109 A1 * | 9/2005 | Kim | 455/415 |

(Continued)

FOREIGN PATENT DOCUMENTS

| | | |
|---|---|---|
| CN | 1809102 A | 7/2006 |
| EP | 0 715 442 A2 | 6/1996 |

(Continued)

OTHER PUBLICATIONS

International Search Report for FR 1161697, dated Jul. 11, 2012.
Chinese Office Action of related Chinese Patent Application No. 201210548385.6 dated Oct. 9, 2015.

*Primary Examiner* — Nghi H Ly

(74) *Attorney, Agent, or Firm* — Arent Fox LLP

(57) ABSTRACT

The invention relates to a method of initiating a conversation, the method comprising the following steps:
  obtaining (3030) a presentation content;
  then, once said content has been obtained, sending (3040) said content to a telecommunications terminal that is to be called; and
  a calling telecommunications terminal calling (3060) said telecommunications terminal that is to be called, the call (3060) including the calling terminal sending an identifier of the terminal that is to be called to a telephone switch;
  the method being characterized in that the step of obtaining and then sending the content are also performed by said calling telecommunications terminal.

16 Claims, 2 Drawing Sheets

(56) References Cited

U.S. PATENT DOCUMENTS

| | | | |
|---|---|---|---|
| 2005/0243982 A1 | 11/2005 | Starbuck et al. | |
| 2005/0258938 A1 | 11/2005 | Moulson | |
| 2006/0203802 A1* | 9/2006 | Chou | H04M 11/066 370/352 |
| 2007/0138301 A1* | 6/2007 | Cinkler | 235/492 |
| 2008/0132255 A1* | 6/2008 | Benco et al. | 455/466 |
| 2008/0248790 A1 | 10/2008 | Ophir et al. | |
| 2009/0019061 A1* | 1/2009 | Scannell, Jr. | G06F 17/30905 |
| 2011/0189983 A1* | 8/2011 | Tanaka | 455/415 |
| 2011/0269506 A1* | 11/2011 | Choi et al. | 455/566 |

FOREIGN PATENT DOCUMENTS

| | | |
|---|---|---|
| EP | 1 843 560 A2 | 10/2007 |
| GB | 2463111 A | 3/2010 |
| WO | WO 02/13547 A2 | 2/2002 |

\* cited by examiner

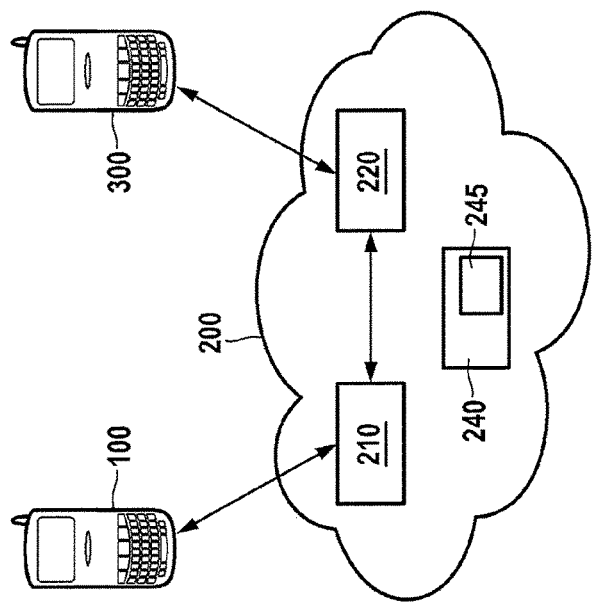
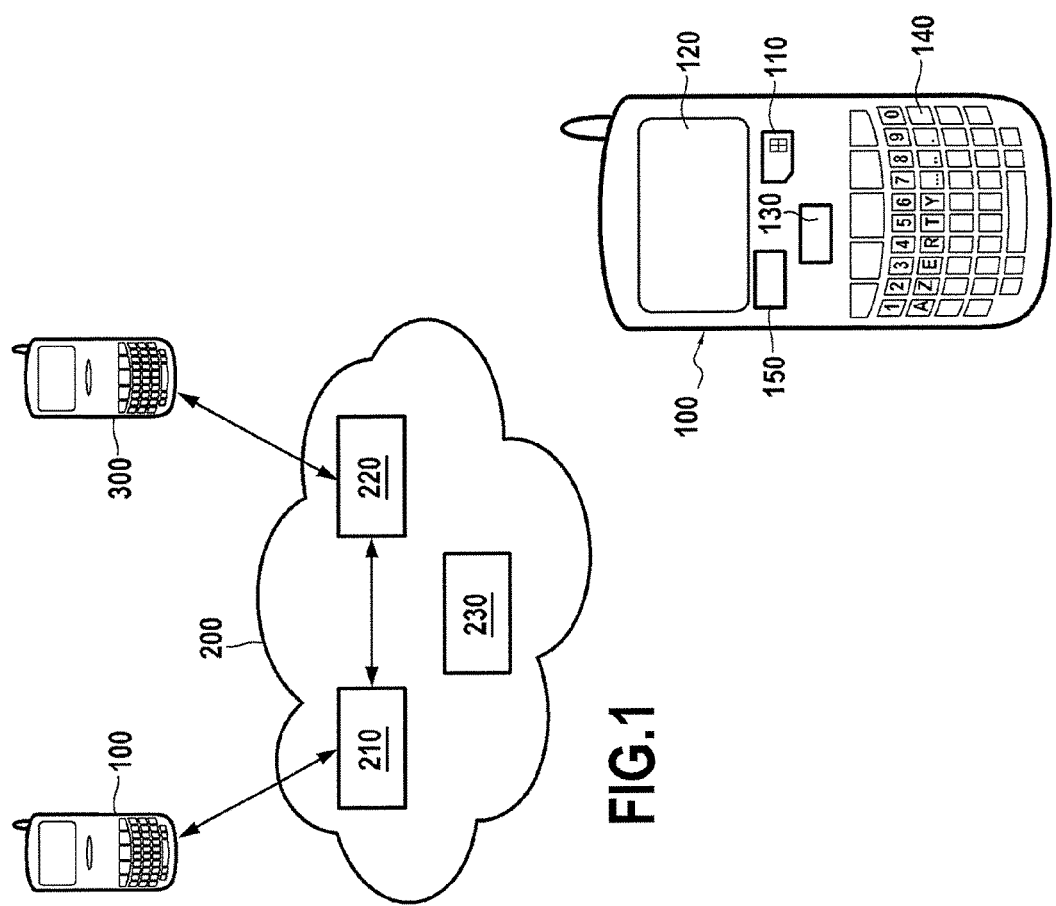

PROCESS OF INITIATION OF A CONVERSATION

TECHNICAL FIELD AND PRIOR ART

The invention relates to telephone applications, in particular for cell phones, and also to portable electronic entities used for embodying such telephones. More specifically, the invention relates to the function of presenting a telephone number and to functions derived therefrom.

Fixed and mobile telephony service networks and suppliers have for many years been proposing the function of presenting the directory number of the caller.

On a network, whether fixed or mobile, the directory number of the caller (mobile station international subscriber directory number (MSISDN)) is known to the switch with which the caller is connected, and it is inserted by the switch into signaling messages of the SS7 signaling protocol of the ISUP (integrated services digital network (ISDN) user part).

At the subscriber end, various implementations are to be found depending on the technology selected by the local operator. For example, in the United States, the number is transmitted by frequency modulation between the first two rings. In certain northern European countries, the number is transmitted by using audible dual tone multifrequency (DTMF) signaling. When the subscriber has a digital connection (ISDN subscription) the number is transmitted in the form of the contents of a variable in the instants that follow the "SETUP" initiation message.

Certain operators also give their subscribers the possibility of knowing the identity of the caller (in the form of forename and family name), but this is obtained by the operator interrogating a database by using the caller's number (reverse directory). The database may be incomplete, and it need not be up to date. Finally, numerous telephony terminals have their own electronic address book including a function enabling them to interrogate the address book on the basis of a calling number in order to extract its identity, providing the calling number is amongst the stored contacts of the called user.

However no service is available that enables the caller to personalize the presentation of a call made to a called party so as to encourage that party to answer the call by being presented with pertinent information.

In a distinct field, namely that of half-duplex communications of the "push to talk" type, such as are to be found on certain mobile telephony networks, functions are known of inserting a business card or personalizing the identification of the caller. Such functions are described in documents WO 2008/046697 and US 2005/0287997.

The services to which they relate are distinct from full-duplex telephony services and cannot be interchanged therewith because conditions of use are different: in a half-duplex conversation, the users must communicate in ordered manner by announcing the beginning and the ending of periods of speech, in order to benefit from good listening quality and avoid making one of the parties repeat what they have said, since only one user can speak at the same time. Conversely, the purpose of a full-duplex conversation service is to allow interactivity without any constraint on how users decide to speak, and without any particular requirements on listening quality.

From a technical point of view, the functions described in documents WO 2008/046697 and US 2005/0287997 make use of a specific push-to-talk conversation server, with communication between the terminals and the server taking place by IP network type packet switching, and with a communications session between the two communication terminals being opened using a session initiation protocol (SIP). An identification message or a pointer to an identification message is inserted by the calling mobile terminal in an SIP INVITE message or in a free text portion of an SIP message, and the push-to-talk conversation server sends to the called terminal the SIP message including the identification message or the pointer.

Because such a system makes use of SIP messages sent from the calling terminal, it cannot be implemented in a telephone conversation on a switched telephone line.

For full-duplex conversations on fixed and mobile telephone networks, making use of conventional telephone switching, document US 2010/0087182 proposes a service for selecting the ring tone that is to be triggered on the called telephone. That service makes use of an application that needs to be present on the called telephone, and of a server having audio files stored therein representing the ring tones that can be selected.

During an initial stage, the caller sets up a connection with the server, and selects one ring tone from the various ring tones made available by the server, and requesting the server to send the file for the selected ring tone to the intended other party. The caller can also record an audio message on the server for use as a ring tone, which message is then transmitted to the future other party. In a second stage, the caller calls the other party directly or alternatively the server calls the other party in the name of the caller. The application at the called telephone triggers the ring tone after recognizing the number of the caller.

That method presents the drawback that the ring tone is defined on the remote server. Thus, the mobile terminal of the caller must be capable of making a connection to that server in order to enable the caller to select the ring tone or to record the audio message. That cannot be done if there is no connection—e.g. outside the coverage of the mobile network—or when the resources of the server are unavailable—if it is overloaded, given its capacity limit. In addition, that system requires a remote server to be put into place and maintained, which can be expensive and complex to do.

SUMMARY OF THE INVENTION

To solve these problems, the invention provides a conversation initiation method for initiating a conversation, particularly but not exclusively an audio conversation, the method comprising the following steps: obtaining a presentation content; then, once the content has been obtained, sending said content to a telecommunications terminal that is to be called; and a calling telecommunications terminal calling said telecommunications terminal that is to be called, the call including the calling terminal sending an identifier of said terminal that is to be called to a telephone switch; the method being characterized in that the step of obtaining and sending the content are performed by said calling telecommunications terminal.

By means of this method, it is not necessary to implement a remote server or a remote application in order to offer the service to the user, and the user has the ability to generate and indeed correct the presentation content independently of whether access to such a remote element is available at a given instant. The service provided is immediate and the user experience is thus better. The telecommunications terminal is a mobile or fixed terminal that is connected to a cellular or a wired telecommunications network.

According to an advantageous characteristic, obtaining presentation content comprises obtaining a text from the user of the calling terminal, e.g. in a pop-up window.

In one implementation, said content is sent by sending an SMS message.

In other implementations, that are not mutually exclusive, said content may be sent by sending a USSD message or an MMS message (a message of the multimedia messaging service type).

According to an advantageous characteristic, the call to the terminal that is to be called is not made until a predetermined duration has elapsed after sending the presentation content. This makes it possible to guarantee that the presentation content has indeed reached its destination. In a variant, the call is not made until receiving an acknowledgment of receipt of the content indicating that the content has been received by the telecommunications terminal that is to be called.

According to an advantageous characteristic, the presentation content is sent with the name of the caller so that said name is displayed together with said content.

According to an advantageous characteristic, the content is signed by cryptographic means or is encrypted.

In another aspect, the invention consists in a computer application that is suitable, when performed by a processor of a telecommunications terminal, for executing the steps of a method as described above.

This implementation offers the advantage of integrating the method of call initiation with content presentation closely in the conventional call-making process that users know and find quick and intuitive.

According to an advantageous characteristic, the application has a mode of operation in which the application requests the user to identify a content in response to the user dialing a telephone number (MSISDN or directory number) together with an alphanumeric sequence for triggering the content definition function.

The application may also have a mode of operation in which it triggers itself or seeks to obtain a presentation content from the user each time the user dials a telephone number (directory number), and a mode of operation in which it asks the user whether a presentation content is to be sent on each occasion that the user dials a telephone number (directory number).

Finally, in another aspect, the invention provides a portable electronic entity including a memory having an application as mentioned above stored therein. The entity may be or may include a microcircuit card, e.g. of the ID-000 format, with the application being stored for example in a microcircuit of the card.

The invention also provides an audio conversation method that is initiated by the above-described initiation method.

The invention is described below with reference to the figures, which are first described briefly.

BRIEF DESCRIPTION OF THE FIGURES

FIG. 1 shows an example of a hardware architecture in which the invention is implemented.

FIG. 2 shows a telecommunications terminal in an embodiment of the invention.

FIG. 4 shows a second example of a hardware architecture in which the invention can be implemented.

DETAILED DESCRIPTION OF THE INVENTION

Figure 3:
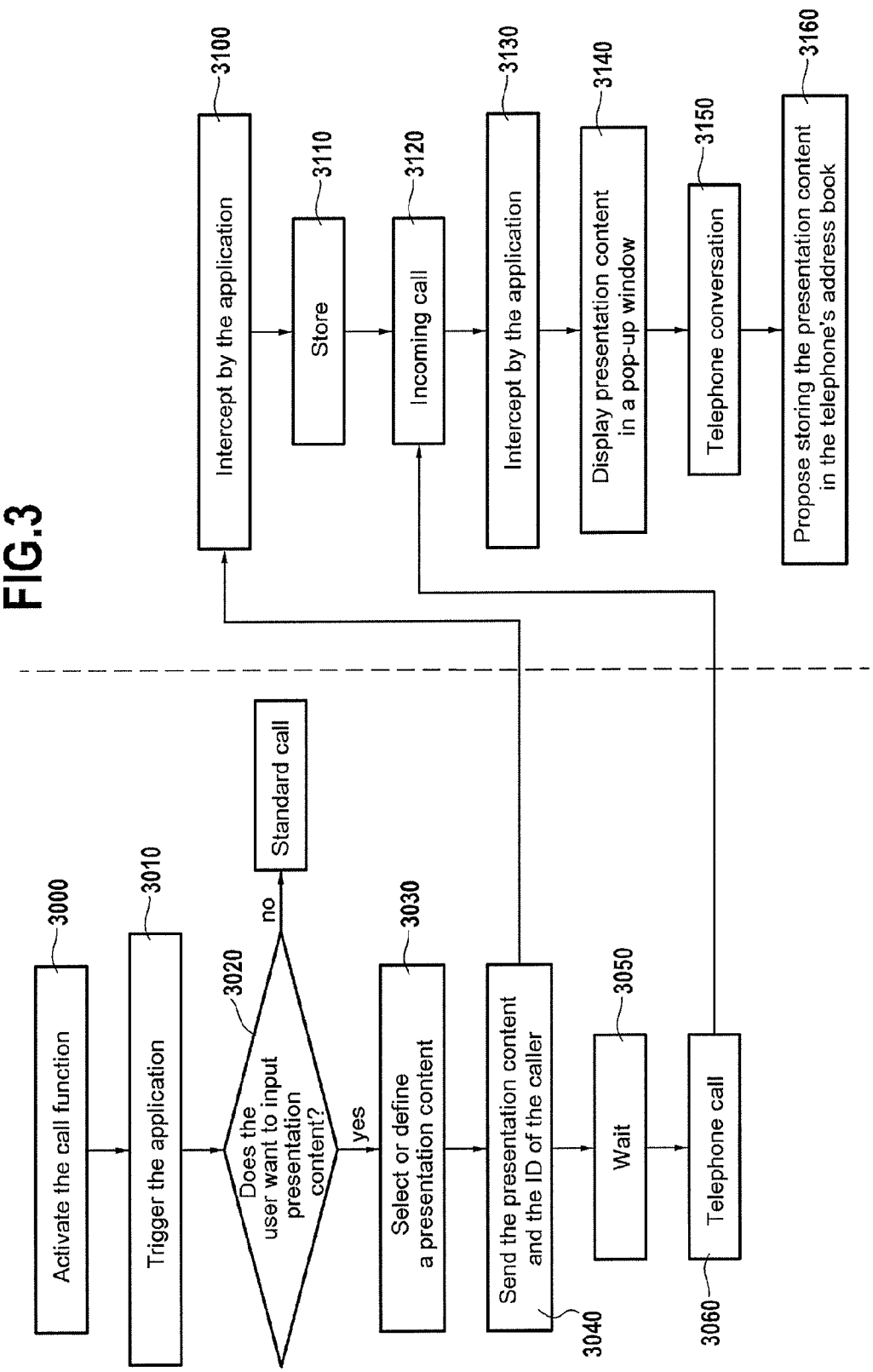
FIG. 3 shows a scenario for performing an implementation of the invention.

FIG. 1 shows two mobile communications terminals 100 and 300 communicating with a telecommunications network 200 complying with the GSM standard (global system for mobile communications). Alternatively, other communications networks could be used. By way of non-limiting example, the communications network may be a mobile telephony network complying with any of the technological standards (3G, 4G, etc. . . . ). The mobile communications terminals 100 and 300 are cell phones. Alternatively, the terminals may be computers that communicate by voice-over Internet protocol (VOIP).

The network 200 has switches 210 and 220 with which the terminals 100 and 300 are respectively in communication. The network 200 also has a service center 230 for a short message service (SMS).

FIG. 2 shows a telecommunications terminal 100 in an embodiment of the invention. The telecommunications terminal 100 possesses a function of calling third party terminals of the network 200 that is itself known and that is not described in detail herein.

A microcircuit card 110 in the ID-000 format (known as a subscriber identification module (SIM)) is inserted in the terminal in order to personalize it. A caller-presentation application is stored in the card 110 (and more precisely in the SIM tool kit (STK) function of the card), and its operation is described in detail below. The card 110 is removable.

The terminal 100 also includes a screen 120, a processor 130, and an alphanumeric keyboard 140 that is real or that is accessible via the screen if it is a touch screen. The terminal 100 also has a memory 150, a loudspeaker and a microprocessor, and circuits for setting up a full duplex audio call during which both parties can both speak at the same time, with resources being allocated simultaneously for transmitting sound in both directions.

Instead of being present in the microcircuit card 110, the presentation application may be present in the memory 150 of the terminal 100, in which case it is downloaded from the network 200 at the initiative of the user. The microcircuit card 110 may be provided to the user with the caller-presentation application pre-loaded by the operator that issued the microcircuit card, or the application may be loaded by a service supplier into the microcircuit card 110 or the memory 150. It may also be present in a portable electronic entity of a kind that is different from the microcircuit card 110 and that is inserted in the terminal in order to personalize it.

The telecommunications terminal 300 presents characteristics similar to the telecommunications terminal 100, and in the embodiment described it likewise includes the presentation application, either in a memory or else in a microcircuit card or some other portable electronic entity that is associated therewith. The elements of the telecommunications terminal 300 are given references herein that are parallel to those of the telecommunications terminal 100, with only the hundreds digit being changed.

FIG. 3 shows a scenario for implementing the invention.

The implementation begins with a step 3000 of activating the call function of the terminal 100. This step may comprise the user dialing the directory number of the person the user seeks to call (the MSISDN number, i.e. the directory number).

This activation of the call function is followed by a step 3010 of triggering the presentation application that is subsequently executed by the processor 130. In two variants, either the presentation application is on standby and it responds automatically to the call function being activated, or else it is initially off, but a function is installed for automatically triggering it when the call function is activated.

In the implementation described herein, the presentation application then acts during a step 3020 to ask the user whether a presentation content should be sent to the other party. The presentation content may be the name of the caller associated with a presentation description of the person. The request is presented on the screen 120, e.g. in the form of a pop-up window, and the user responds by using the keyboard 140. Other ways of presenting the request and of responding to it may be implemented in variants.

If the user gives a negative response, the presentation application is deactivated or put on standby, and the call continues in standard manner.

Otherwise, if the user responds in positive manner, the presentation application acts during a step 3030, e.g. by means of a pop-up window displayed on the screen 120, to ask the user to input the presentation content. In the embodiment shown, this content is text, and it is input by the user acting on the keyboard 140. Alternatively, the presentation content is a sound or video message stored using a microphone or a camera incorporated in the terminal 100.

In a variant, the application is used to send a presentation content systematically. In another variant, it is the user who inputs an alphanumeric string in addition to the called directory number (before or after it), thereby triggering the request to input a presentation content. In yet another variant, the application is triggered for pre-selected contacts in the terminal's telephone address book.

In another variant, at the stage of the request for inputting presentation content, the user may select presentation content that is already stored in the memory 150 of the terminal 100, or in the microcircuit card 110. These contents may optionally be associated with a plurality of recipients.

Once the processor 130 of the terminal 100 has obtained the presentation content, it acts during a step 3040 to send the presentation content in the form of an SMS that is sent to the other party. If the content includes sound or video, the content is sent in the form of an MMS (a multimedia messaging service message).

In an implementation, the MSISDN telephone number of the other party is dialed at this stage by the user. In another variant, the MSISDN number of the other party may also be input between steps 3020 and 3030.

During the step 3040, the terminal 100 sends a single SMS (or MMS) containing both the presentation content and the directory number (MSISDN) of the user of the terminal 100, as indicated in the microcircuit card 110. Thus, the number of the caller is associated in the message with the presentation content. In addition, the SMS presents an element (a format or an identifier) that makes it possible to recognize that it has been prepared and sent by the presentation application.

During a waiting step 3050, the terminal 100 waits a little to leave the SMS sufficient time to reach its destination. In an implementation, this waiting period is 5 seconds (s). The SMS is transmitted through the network 200 to the SMS service center 230 which forwards it to the terminal 300 on the basis of its MSISDN directory number.

During a step 3100, the SMS sent by the terminal 100 is received by the terminal 300.

In an implementation, when this terminal receives any SMS, the reception of the SMS triggers analysis of the message by the presentation application, which application was either on standby or else inactive in the terminal 300. Where appropriate, the SMS is recognized by the presentation application as being an SMS that was sent by another presentation application, and then during a step 3110, it is stored in the memory 350 without informing the user of the terminal 300. In a variant, it may be stored in the microcircuit card 310.

In a particular implementation, if an SMS sent by a presentation application is already in the memory and associated with an incoming call number, it is deleted and replaced by the SMS that has been newly received in this way.

During a step 3060, the terminal 100 sends a telephone call to the other party by dialing its MSISDN number and sending that number to the switch 210 with which it is in communication in the network 200. In a variant, the call is not sent until an acknowledgment has been received for the SMS, indicating that it has been received by the recipient. In a variant, the acknowledgment is sent by the terminal 300 only after it has been validated by the called party.

The switch 210 then uses various elements of the network 200 to make contact with the switch 220 that is connected with the terminal 300. The network then informs the terminal 300 that it has an incoming call, in conventional manner.

The number of the caller (MSISDN) is presented, firstly because the caller has authorized (or has not inhibited) the number presentation function, and secondly because the network 200 knows how to transmit the number of the calling line from one switch to another, e.g. in messages complying with the SS7 standard.

During a step 3120, the terminal 300 observes the incoming call request. In response, the presentation application is triggered during a step 3130, and the application searches among the stored SMS messages that have been received from other presentation applications for a presentation content associated with the (MSISDN) number of the calling line for the current incoming call.

The presentation content is presented to the user of the terminal 300 during a presentation step 3140, making use, in different variants, e.g. of the screen with a pop-up window for presenting text or a video, and of the loudspeaker for presenting a sound message, depending on the nature of the presentation content. In one implementation, a graphical or alphanumeric indication specifies explicitly that the presentation content is "as given by the caller", so as to remind the user of the terminal 300 that it is not the telephone operator or some other intermediary that has intervened in defining the content as presented in this way.

In a variant, the terminal 300 display presentation contents only when the MSISDN number of the caller is not listed in the telephone address book of the terminal 300, or on the contrary only when it is.

Depending on the presentation content, the user of the terminal 300 decides to answer the call, to dismiss the call, or to pay no attention to it.

A conversation step 3150 may then take place. Under such circumstances, the two terminals 100 and 300 are put into communication by the network 200.

Finally, in optional manner, the presentation application may give the user of the terminal 300 the possibility of storing the presentation content received by the SMS in association with the directory number of the caller in the telephone address book of the terminal 300, in its memory 350 or in the microcircuit card 310 inserted in the terminal. This storage operation is performed during a step 3160. If the user refuses, the presentation content is deleted.

FIG. 4 shows the elements involved in a second implementation of the invention. As in the first implementation, the calling terminal 100 calls a called terminal 300 via the network 200, the call making use of the switches 210 and 220.

In this implementation, the presentation content is sent by the terminal 100 in an unstructured supplementary service data (USSD) message. It is associated in the message with an MSISDN identifier of the caller and the MSISDN identifier of the called party. The USSD message is sent to the telephone operator that provides the user of the terminal 100 with telephone service.

The operator receives the message and processes it with a server 240 running an application 245 for processing USSD messages that include a presentation content. The application identifies the received message as being a USSD message including presentation content. From the message, it extracts the MSISDN identifier of the called party. It then sends a message to the called terminal including the presentation content and the MSISDN identifier of the caller. This message sent by the application 245 may be of various kinds. It may be an SMS or it may be a USSD message.

The terminal 300 receives the message sent by the application 245 and processes it as described above with reference to the first implementation.

The presentation application may be made secure by encryption in compliance with the federal information processing standard (FIPS), e.g. the FIPS 140 standard.

For example, the presentation content is encrypted using a cryptographic key that is accessible to the presentation application of the caller, e.g. in the card 110. The caller then sends an encrypted presentation message or encrypted verification data, or a presentation message that is signed by means of the key.

The caller also has the same cryptographic key available for verifying the content of the presentation. Verification may be performed by decryption or by calculating a message authentication code from the received data.

Since the application is provided by a single service provider (telephone operator) it is easy to exchange encryption and verification keys in order to provide cryptographic security.

Alternatively, a key-deriving mechanism may be implemented in order to encrypt the presentation content, e.g. by deriving the key from a master key supplied by the service provider on the basis of the called number. Thus, the called party, to whom the same master key has already been supplied, can derive the key by using the called telephone number and can verify that the content is authentic.

The authentication, integrity, and/or signature cryptographic mechanism may be adapted to satisfy security requirements.

In a variant, the terminal does not receive a microcircuit card, but includes a secure microcircuit incorporated in the terminal and having the presentation application stored therein.

In a variant, the presentation content comprises an image, e.g. a photograph of the caller, or more precisely of the caller's face.

In a variant, the presentation content is sent only if the content has already been sent to the communications terminal that is to be called. In practice, one way of performing this function is as follows: the calling telecommunications terminal keeps a list of identifiers of terminals to which the content has already been sent (e.g. telephone numbers), and before sending a presentation content it verifies whether the terminal that is to be called is to be found in the list, and the content is sent only if the number is in the list, and it is not sent otherwise. On receiving a caller identifier (directory number or other content encoded on fewer bytes), the terminal that is to be called retrieves the corresponding image from its own memory, e.g. in a table associating the identifier and the image, and displays the image on its screen on receiving the corresponding call.

The invention is not limited to the implementations described but extends to any variant thereof that come within the scope of the claims.

The invention claimed is:

1. A conversation initiation method for initiating a conversation, the method comprising:
obtaining, by an application of a calling telecommunications terminal, a presentation content;
sending, by the application of the calling telecommunications terminal, the obtained presentation content from the calling telecommunications terminal to a telecommunications terminal that is to be called;
initiating a call with the telecommunications terminal by the calling telecommunications terminal including sending an identifier of the telecommunications terminal to a telephone switch; and
requesting, from a user by the application of the calling telecommunications terminal, confirmation whether the presentation content should be sent to the telecommunications terminal that is to be called,
wherein the application of the calling telecommunications terminal is deactivated or out on standby when the user response is a negative response,
wherein the call by the calling telecommunications terminal is made after the presentation content has been received by the telecommunications terminal, and
wherein the application of the calling telecommunications terminal is executed by a triggering following an activation of a call function.

2. The conversation initiation method according to claim 1, wherein obtaining the presentation content comprises obtaining a text from a user of the calling telecommunications terminal.

3. The conversation initiation method according to claim 2, wherein the text is obtained in a pop-up window.

4. The conversation initiation method according to claim 1, wherein the presentation content is sent with a name of a caller so that said name is displayed together with said content.

5. The conversation initiation method according to claim 1, wherein the sending of said content comprises sending a short message service (SMS) message, an unstructured supplementary service data (USSD) message, or a multimedia messaging service (MMS) message.

6. The conversation initiation method according to claim 1, wherein the call is not made to the telecommunications terminal that is to be called until after a predetermined duration has elapsed after the presentation content has been sent.

7. The conversation initiation method according to claim 1, wherein the call is made only after receiving an acknowledgement of receipt of the content indicating that the content has been received by the telecommunications terminal that is to be called.

8. The conversation initiation method according to claim 1, wherein the telecommunications terminal is a mobile terminal.

9. The conversation initiation method according to claim 1, wherein the content is signed by cryptographic means or is encrypted.

10. An audio conversation method initiated by the initiation method according to claim 1.

11. A computer application performed by a processor of a first telecommunications terminal for executing:
   obtaining, by an application of the first telecommunications terminal, a presentation content;
   sending, by the application of the first telecommunications terminal, the obtained presentation content from the first telecommunications terminal to a second telecommunications terminal that is to be called;
   initiating a call with the second telecommunications terminal by the first telecommunications terminal including sending an identifier of the second telecommunications terminal to a telephone switch; and
   requesting, from a user by the application of the calling telecommunications terminal, confirmation whether the presentation content should be sent to the telecommunications terminal that is to be called,
   wherein the application of the calling telecommunications terminal is deactivated or put on standby when the user response is a negative response,
   wherein the call by the first telecommunications terminal is made after the presentation content has been received by the second telecommunications terminal, and
   wherein the application of the calling telecommunications terminal is executed by a triggering following an activation of a call function.

12. The application according to claim 11, further comprising requesting a user to identify the presentation content in response to a user dialing a telephone number together with an alphanumeric sequence for triggering the content definition function.

13. The application according to claim 11, further comprising obtaining the presentation content each time a user dials a telephone number.

14. The application according to claim 11, further comprising inquiring a user whether the presentation content is to be sent on each occasion that the user dials a telephone number.

15. A portable electronic entity including a memory having an application according to claim 11 stored therein.

16. The portable electronic entity according to claim 15, wherein the portable electronic entity comprises a microcircuit card of the ID-000 format, with the application being stored in a microcircuit of the card.

* * * * *